US011930394B2

(12) United States Patent
Landais et al.

(10) Patent No.: US 11,930,394 B2
(45) Date of Patent: Mar. 12, 2024

(54) OVERLOAD CONTROL INFORMATION FROM A NETWORK FUNCTION SERVICE CONSUMER IN 5G CORE NETWORK (5GC) SERVICE BASED ARCHITECTURE (SBA)

(71) Applicant: NOKIA TECHNOLOGIES OY, Espoo (FI)

(72) Inventors: Bruno Landais, Pleumeur-Bodou (FR); Horst Thomas Belling, Erding (DE); Georgios Gkellas, Petroupoli (GR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/206,842

(22) Filed: Mar. 19, 2021

(65) Prior Publication Data

US 2021/0306907 A1 Sep. 30, 2021

Related U.S. Application Data

(60) Provisional application No. 62/993,961, filed on Mar. 24, 2020.

(51) Int. Cl.
*H04W 28/02* (2009.01)

(52) U.S. Cl.
CPC ... *H04W 28/0289* (2013.01); *H04W 28/0284* (2013.01)

(58) Field of Classification Search
CPC ......... H04W 28/0289; H04W 28/0284; H04W 28/08; H04W 28/10; H04L 47/12; H04L 47/33; H04L 67/1008; H04L 5/0053
See application file for complete search history.

(56) References Cited

U.S. PATENT DOCUMENTS

2020/0153734 A1* 5/2020 Nainar .................... H04L 69/22
2021/0258872 A1* 8/2021 Mihály ................ H04W 60/00
(Continued)

FOREIGN PATENT DOCUMENTS

| | | | |
|---|---|---|---|
| EP | 3574704 | A1 | 4/2019 |
| EP | 3485610 | A1 | 5/2019 |
| WO | 2019/210675 | A1 | 11/2019 |

OTHER PUBLICATIONS

First Examination Report issued in corresponding Indian Patent Application No. 202114012476 dated Feb. 3, 2022.
(Continued)

*Primary Examiner* — Khaled M Kassim
*Assistant Examiner* — Najeeb Ansari
(74) *Attorney, Agent, or Firm* — SQUIRE PATTON BOGGS (US) LLP

(57) ABSTRACT

Systems, methods, apparatuses, and computer program products for load and/or overload control in 5GC SBA are provided. One method may include transmitting, from a network function (NF) service consumer, overload control information (OCI) comprising scope information to a network function (NF) service producer or service communication proxy (SCP). The scope information may include at least one of: scope set to a notification uniform resource identifier (URI), or scope set to one of network function (NF) service instance, network function (NF) service set, network function (NF) instance, or network function (NF) set, and optionally a service name.

20 Claims, 4 Drawing Sheets

Receiving OCI including scope information — 350

Throttling and/or redirecting notifications — 360

(56) References Cited

U.S. PATENT DOCUMENTS

2022/0124468 A1* 4/2022 Lu .......................... H04L 67/51
2022/0248316 A1* 8/2022 Castellanos Zamora .................. H04L 65/1073

OTHER PUBLICATIONS

3rd Generation Partnership Project; Technical Specification Group Services and System Aspects; System architecture for the 5G System (5GS); Stage 2 (Release 16); 3GPP TS 23.501, V16.4.0, Mar. 2020.
3rd Generation Partnership Project; Technical Specification Group Services and System Aspects; Procedures for the 5G System (5GS); Stage 2 (Release 16); 3GPP TS 23.502, V16.4.0, Mar. 2020.
3rd Generation Partnership Project; Technical Specification Group Core Network and Terminals; 5G System; Technical Realization of Service Based Architecture; Stage 3 (Release 16); 3GPP TS 29.500, V16.3.0, Mar. 2020.
Nokia et al., "Binding procedures", Change Request 29.500 16.2.1, 3GPP TSG-CT WG4 Meeting #96, C4-201232, Feb. 24, 2020.
3rd Generation Partnership Project; Technical Specification Group Core Network and Terminals; 5G System; Network Function Repository Services; Stage 3 (Release 16); 3GPP TS 29.510, V16.3.0, Mar. 2020.
Huawei et al., "3GPP Rel-16 LOLC implications on Nnrf service", Change Request 29.510 16.2.0, 3GPP TSG-CT Meeting #96e, C4-200320, Feb. 17, 2020.
Huawei et al., "Description of the 3GPP Rel-16 OLC", Change Request 29.500 16.2.1, 3GPP TSG-CT WG4 Meeting #96e, C4-201186, Feb. 17, 2020.
Huawei et al., "Dynamic Load Control", Change Request 29.500 16.2.1, 3GPP TSG-CT WG4 Meeting #96e, C4-201219, Feb. 17, 2020.
Extended European Search Report issued in corresponding European Patent Application No. 21164463.8 dated Aug. 12, 2021.
Huawei et al., "Description of the 3GPP Rel-16 OLC", 3GPP Draft; CP-200025, 3rd Generation Partnership Project (3GPP), vol. CT WG4, Mar. 5, 2020, XP051859293, Retrieved from the Internet: URL: https://ftp.3gpp.org/tsg_ct/TSG_CT/TSGC_87e/Docs/CP-200025.zip29500_CR0074r6_(Rel-16)_C4-201186_29500_CR0074_OLC_Rel-16.docx.
"3rd Generation Partnership Project: Technical Specification Group Core Network and Terminals; Study on Load and Overload Control of 5GC Service Based Interfaces; (Release 16)", 3GPP Standard; Technical Report; 3GPP TR 29.843, 3rd Generation Partnership Project (3GPP), No. V16.0.0, Sep. 23, 2019, XP051784780, Retrieved from the Internet: URL: ftp://ftp.3gpp.org/Specs/archive/29_series/29.843/29843-g00.zip 2943-g00.docx.
First Office Action issued in corresponding Chinese Patent Application No. 202110313878.0, dated Dec. 26, 2023, with concise English language summary thereof.

* cited by examiner

OVERLOAD CONTROL INFORMATION FROM A NETWORK FUNCTION SERVICE CONSUMER IN 5G CORE NETWORK (5GC) SERVICE BASED ARCHITECTURE (SBA)

CROSS-REFERENCE TO RELATED APPLICATIONS

This application claims priority from U.S. provisional patent application No. 62/993,961 filed on Mar. 24, 2020. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for load and/or overload control in 5$^{th}$ generation core network (5GC) service based architecture (SBA).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus including at least one processor and at least one memory comprising computer program code. the at least one memory and computer program code may be configured, with the at least one processor, to cause the apparatus at least to perform: transmitting overload control information (OCI) comprising scope information to a network function (NF) service producer or service communication proxy (SCP). The scope information may include at least one of: a scope set to at least one callback uniform resource identifier (URI), and/or a scope set to one of a network function (NF) service instance, network function (NF) service set, network function (NF) instance, or network function (NF) set, and optionally a service name.

An embodiment may be directed to an apparatus including means for transmitting overload control information (OCI) comprising scope information to a network function (NF) service producer or service communication proxy (SCP). The scope information may include at least one of: a scope set to at least one callback uniform resource identifier (URI), and/or a scope set to one of a network function (NF) service instance, network function (NF) service set, network function (NF) instance, or network function (NF) set, and optionally a service name.

An embodiment may be directed to a method including transmitting, from a network function (NF) service consumer, overload control information (OCI) comprising scope information to a network function (NF) service producer or service communication proxy (SCP). The scope information may include at least one of: a scope set to at least one callback uniform resource identifier (URI), and/or a scope set to one of a network function (NF) service instance, network function (NF) service set, network function (NF) instance, or network function (NF) set, and optionally a service name.

An embodiment may be directed to a computer readable medium comprising program instructions stored thereon for performing at least the following: transmitting overload control information (OCI) comprising scope information to a network function (NF) service producer or service communication proxy (SCP). The scope information may include at least one of: a scope set to at least one callback uniform resource identifier (URI), and/or a scope set to one of a network function (NF) service instance, network function (NF) service set, network function (NF) instance, or network function (NF) set, and optionally a service name.

An embodiment may be directed to an apparatus including at least one processor and at least one memory comprising computer program code. The at least one memory and computer program code may be configured, with the at least one processor, to cause the apparatus at least to perform: receiving overload control information (OCI) comprising scope information from a network function (NF) service consumer, and, based on the received overload control information (OCI), throttling notifications toward overloaded targets and/or redirecting notifications towards other targets to reduce traffic of callback requests. The scope information may include at least one of: a scope set to at least one callback uniform resource identifier (URI), and/or a scope set to one of a network function (NF) service instance, network function (NF) service set, network function (NF) instance, or network function (NF) set, and optionally a service name.

An embodiment may be directed to an apparatus including means for receiving overload control information (OCI) comprising scope information from a network function (NF) service consumer, and, based on the received overload control information (OCI), means for throttling notifications toward overloaded targets and/or means for redirecting notifications towards other targets to reduce traffic of callback requests. The scope information may include at least one of: a scope set to at least one callback uniform resource identifier (URI), and/or a scope set to one of a network function (NF) service instance, network function (NF) service set, network function (NF) instance, or network function (NF) set, and optionally a service name.

An embodiment may be directed to a method including receiving, at a network function (NF) service producer or service communication proxy (SCP), overload control information (OCI) comprising scope information from a network function (NF) service consumer. Based on the received overload control information (OCI), the method may include throttling notifications toward overloaded targets and/or redirecting notifications towards other targets to reduce traffic of callback requests. The scope information may include at least one of: a scope set to at least one callback uniform resource identifier (URI), and/or a scope set to one of a network function (NF) service instance, network function (NF) service set, network function (NF) instance, or network function (NF) set, and optionally a service name.

An embodiment may be directed to a computer readable medium comprising program instructions stored thereon for performing at least the following: receiving overload control information (OCI) comprising scope information from a network function (NF) service consumer, and, based on the received overload control information (OCI), means for throttling notifications toward overloaded targets and/or means for redirecting notifications towards other targets to reduce traffic of callback requests. The scope information may include at least one of: a scope set to at least one callback uniform resource identifier (URI), and/or a scope set to one of a network function (NF) service instance, network function (NF) service set, network function (NF) instance, or network function (NF) set, and optionally a service name.

An embodiment may be directed to an apparatus including at least one processor and at least one memory comprising computer program code. The at least one memory and computer program code may be configured, with the at least one processor, to cause the apparatus at least to perform: transmitting overload control information (OCI) comprising scope information to a network function (NF) service producer or service communication proxy (SCP). The scope information may include a scope that is set to one of: at least one callback uniform resource identifier (URI), a network function (NF) service instance, network function (NF) service set, network function (NF) instance, or network function (NF) set, and optionally a service name. When the scope is set to the at least one callback uniform resource identifier (URI), the overload control information (OCI) is configured to apply to notification or callback requests with a callback uniform resource identifier (URI) matching the at least one callback uniform resource identifier (URI) set in the scope. When the scope is set to one of the network function (NF) service instance, the network function (NF) service set, the network function (NF) instance, or the network function (NF) set, optionally together with the service name, the overload control information (OCI) is configured to apply to notification or callback requests with a matching binding indication.

An embodiment may be directed to an apparatus including means for transmitting overload control information (OCI) comprising scope information to a network function (NF) service producer or service communication proxy (SCP). The scope information may include a scope that is set to one of: at least one callback uniform resource identifier (URI), a network function (NF) service instance, network function (NF) service set, network function (NF) instance, or network function (NF) set, and optionally a service name. When the scope is set to the at least one callback uniform resource identifier (URI), the overload control information (OCI) is configured to apply to notification or callback requests with a callback uniform resource identifier (URI) matching the at least one callback uniform resource identifier (URI) set in the scope. When the scope is set to one of the network function (NF) service instance, the network function (NF) service set, the network function (NF) instance, or the network function (NF) set, optionally together with the service name, the overload control information (OCI) is configured to apply to notification or callback requests with a matching binding indication.

An embodiment may be directed to a method that may include transmitting, from a network function (NF) service consumer, overload control information (OCI) comprising scope information to a network function (NF) service producer or service communication proxy (SCP). The scope information may include a scope that is set to one of: at least one callback uniform resource identifier (URI), a network function (NF) service instance, network function (NF) service set, network function (NF) instance, or network function (NF) set, and optionally a service name. When the scope is set to the at least one callback uniform resource identifier (URI), the overload control information (OCI) is configured to apply to notification or callback requests with a callback uniform resource identifier (URI) matching the at least one callback uniform resource identifier (URI) set in the scope. When the scope is set to one of the network function (NF) service instance, the network function (NF) service set, the network function (NF) instance, or the network function (NF) set, optionally together with the service name, the overload control information (OCI) is configured to apply to notification or callback requests with a matching binding indication.

An embodiment may be directed to a computer readable medium comprising program instructions stored thereon for performing at least the following: transmitting overload control information (OCI) comprising scope information to a network function (NF) service producer or service communication proxy (SCP). The scope information may include a scope that is set to one of: at least one callback uniform resource identifier (URI), a network function (NF) service instance, network function (NF) service set, network function (NF) instance, or network function (NF) set, and optionally a service name. When the scope is set to the at least one callback uniform resource identifier (URI), the overload control information (OCI) is configured to apply to notification or callback requests with a callback uniform resource identifier (URI) matching the at least one callback uniform resource identifier (URI) set in the scope. When the scope is set to one of the network function (NF) service instance, the network function (NF) service set, the network function (NF) instance, or the network function (NF) set, optionally together with the service name, the overload control information (OCI) is configured to apply to notification or callback requests with a matching binding indication.

An embodiment may be directed to an apparatus that may include at least one processor and at least one memory comprising computer program code. The at least one memory and computer program code may be configured, with the at least one processor, to cause the apparatus at least to perform: receiving overload control information (OCI) comprising scope information from a network function (NF) service consumer, and, based on the received overload control information (OCI), throttling notifications toward overloaded targets and/or redirecting notifications towards other targets to reduce traffic of callback requests. The scope information may include a scope set to one of: at least one callback uniform resource identifier (URI), a network function (NF) service instance, network function (NF) service set, network function (NF) instance, or network function (NF) set, and optionally a service name. When the scope is set to the at least one callback uniform resource identifier (URI), the overload control information (OCI) is configured to apply to notification or callback requests with a callback uniform resource identifier (URI) matching the at least one callback uniform resource identifier (URI) set in the scope. When the scope is set to one of the network function (NF) service instance, the network function (NF) service set, the network function (NF) instance, or the network function (NF) set, optionally together with the service name, the overload control information (OCI) is configured to apply to notification or callback requests with a matching binding indication.

An embodiment may be directed to an apparatus that may include means for receiving overload control information (OCI) comprising scope information from a network function (NF) service consumer, and, based on the received overload control information (OCI), means for throttling notifications toward overloaded targets and/or means for redirecting notifications towards other targets to reduce traffic of callback requests. The scope information may include a scope set to one of: at least one callback uniform resource identifier (URI), a network function (NF) service instance, network function (NF) service set, network function (NF) instance, or network function (NF) set, and optionally a service name. When the scope is set to the at least one callback uniform resource identifier (URI), the overload control information (OCI) is configured to apply to notification or callback requests with a callback uniform resource identifier (URI) matching the at least one callback uniform resource identifier (URI) set in the scope. When the scope is set to one of the network function (NF) service instance, the network function (NF) service set, the network function (NF) instance, or the network function (NF) set, optionally together with the service name, the overload control information (OCI) is configured to apply to notification or callback requests with a matching binding indication.

An embodiment may be directed to a method that may include receiving, at a network function (NF) service producer or service communication proxy (SCP), overload control information (OCI) comprising scope information from a network function (NF) service consumer, and, based on the received overload control information (OCI), throttling notifications toward overloaded targets and/or redirecting notifications towards other targets to reduce traffic of callback requests. The scope information may include a scope set to one of: at least one callback uniform resource identifier (URI), a network function (NF) service instance, network function (NF) service set, network function (NF) instance, or network function (NF) set, and optionally a service name. When the scope is set to the at least one callback uniform resource identifier (URI), the overload control information (OCI) is configured to apply to notification or callback requests with a callback uniform resource identifier (URI) matching the at least one callback uniform resource identifier (URI) set in the scope. When the scope is set to one of the network function (NF) service instance, the network function (NF) service set, the network function (NF) instance, or the network function (NF) set, optionally together with the service name, the overload control information (OCI) is configured to apply to notification or callback requests with a matching binding indication.

An embodiment may be directed to a computer readable medium comprising program instructions stored thereon for performing at least the following: receiving overload control information (OCI) comprising scope information from a network function (NF) service consumer, and, based on the received overload control information (OCI), throttling notifications toward overloaded targets and/or redirecting notifications towards other targets to reduce traffic of callback requests. The scope information may include a scope set to one of: at least one callback uniform resource identifier (URI), a network function (NF) service instance, network function (NF) service set, network function (NF) instance, or network function (NF) set, and optionally a service name. When the scope is set to the at least one callback uniform resource identifier (URI), the overload control information (OCI) is configured to apply to notification or callback requests with a callback uniform resource identifier (URI) matching the at least one callback uniform resource identifier (URI) set in the scope. When the scope is set to one of the network function (NF) service instance, the network function (NF) service set, the network function (NF) instance, or the network function (NF) set, optionally together with the service name, the overload control information (OCI) is configured to apply to notification or callback requests with a matching binding indication.

BRIEF DESCRIPTION OF THE DRAWINGS

For proper understanding of example embodiments, reference should be made to the accompanying drawings, wherein.

DETAILED DESCRIPTION

Figure 1:
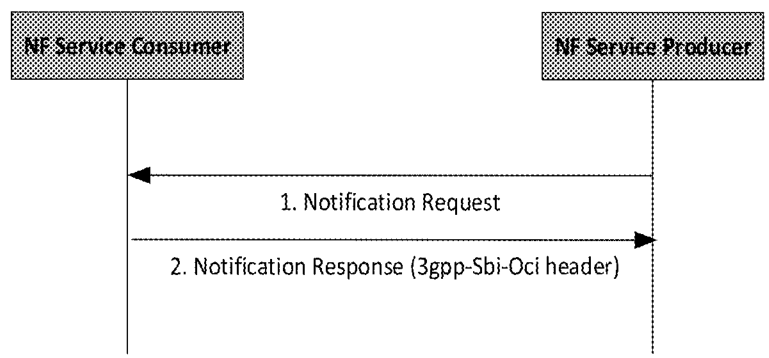
FIG. 1 illustrates an example signaling diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for load and/or overload control in 5GC SBA, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

3rd Generation Partnership Project (3GPP) is considering load and overload control solutions for the 5GC service based interfaces in Release-16. One issue receiving consideration is determining the scope of the overload information a network function (NF) service consumer signals to an NF service producer (to throttle notifications generated by the producer towards a consumer in overload). It is noted that 3GPP technical specification (TS) 23.501 and TS 23.502 include details on the 5GC SBA.

Overload control enables an NF service producer or an NF service becoming or being overloaded to gracefully reduce its incoming signalling load. For example, overload control may include instructing NF service consumers to reduce sending service requests or instructing NF service producers to reduce sending notification requests respectively, according to its available signalling capacity to successfully process the requests. An NF service producer or an NF service consumer is in overload when it operates over its signalling capacity.

An NF service producer or an NF service consumer that experience an overload can provide overload control information (OCI) to its peers, e.g., by including a 3GPP-service based interface (SBI)-OCI header in a service request or response. The OCI may contain the time stamp when the OCI was generated, a traffic reduction metric indicating the percentage of traffic reduction the receiver of the OCI should apply, a period of validity of the OCI, and/or a scope information indicating what is the applicability of the OCI.

Figure 2:
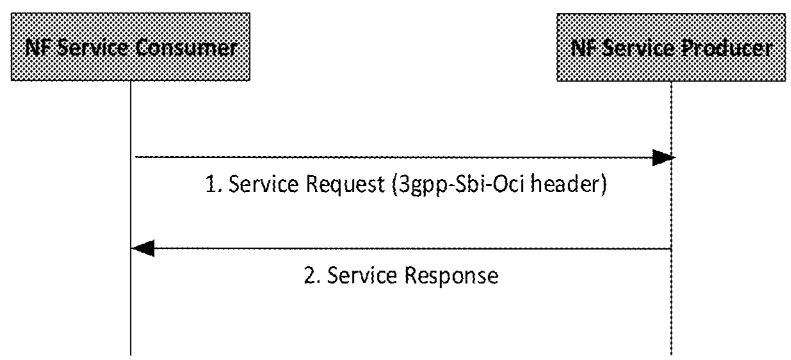
FIG. 2 illustrates an example signaling diagram, according to another embodiment.

FIG. 1 illustrates an example signaling diagram depicting signaling between a NF service consumer and a NF service producer. The example of FIG. 1 illustrates a NF service consumer signaling overload to a NF service producer within a notification response (any status code, i.e., successful or failure response). FIG. 2 illustrates another example signaling diagram depicting signaling between a NF service consumer and a NF service producer. The example of FIG. 2 illustrates a NF service consumer in overload signalling OCI to an NF service producer in a service request (sent to the same producer's service).

For an OCI sent by an NF service producer, the scope of the OCI may take any of the following values: NF-Instance, NF-Set, NF-Service, and/or NF-Service-Set. NF-Instance indicates that OCI applies to all services of an NF instance identified by its NF instance ID. NF-Set indicates that OCI applies to all services of all NF instances of an NF set, identified by its NF Set ID. NF-Service indicates that OCI applies to a specific service instance, identified by the NF service ID. NF-Service-Set indicates that OCI applies to all service instances of an NF service set identified by its NF service set ID.

However, it is not yet defined in 3GPP specifications what scope information a NF service consumer should be able to signal to an NF service producer and how an NF service producer identifies the corresponding notification and/or callback requests that should be throttled.

It is noted that the scenario of a service consumer signalling overload to a service producer is very different and more complex than the scenario of an NF service producer signalling overload to a service consumer. This is because in the scenario of an NF service producer signalling overload to a service consumer, a service consumer or service communication proxy (SCP) always knows the target recipient (NF instance ID, NF service instance, NF set, NF service set) of a service request (so it can throttle traffic as requested by the OCI signaled by the producer). Whereas, in the scenario of a service consumer signalling overload to a service producer, the NF service producer may not have information available about the consumer who has created a subscription, so care is needed so that the scope advertised by a service consumer is interpretable by the service producer.

According to certain embodiments, an overload in an NF service consumer may affect the entire NF or only specific services within the NF service consumer, for example, the service(s) that handle certain notifications. In the former case, NF service producers may be configured to throttle any notification sent towards the NF service consumer (according to the traffic reduction metric). In the latter case, NF service producers may be configured to throttle just notifications that are handled by the overloaded services. Alternatively, the NF service producer may be configured to send these notifications to an alternative NF consumer instance (if possible).

In some embodiments, an overload may also affect not only the NF service consumer, but the entire NF set to which the NF service consumer pertains (e.g., an entire access and mobility management function (AMF) or unified data management (UDM) set), or an entire NF service set within the NF service consumer instance, e.g., an SMF service set. In such cases, according to an embodiment, the NF service producers may be configured to throttle notifications targeting the entire NF Set or NF service set.

Certain embodiments are configured to enable the support of either one or both of the following scope information for an OCI: (a) scope set to a notification (callback) uniform resource identifier (URI), and/or (b) scope set to NF Service Instance, NF Service Set, NF Instance or NF Set, plus optionally service name. In an embodiment, the OCI may be sent by the NF service consumer towards an NF service producer or possible SCP.

According to one embodiment, an OCI with a scope set to a notification (callback) URI, as defined in IETF RFC 3986, may include an authority (host and optional port) and an optional path. An OCI received with this scope applies to all notification or callback requests with a notification (callback) URI matching the notification URI received in the scope. In an embodiment, the notification URI of a notification (or callback) request matches the notification URI received in the scope of the OCI when the former contains the same scheme, the same authority, and/or has a path that encompasses the path of the latter.

In an embodiment, an OCI received with a scope set to NF service instance, NF service set, NF instance or NF set, plus optionally service name, may apply to all notification or callback requests received with a matching binding indication (binding indication for notification/callbacks, i.e., with scope set to "callback"). (See 3GPP TS 29.500, clause 6.12.4).

Thus, certain embodiments enable an NF service consumer to signal an overload condition to NF service producers. This allows for a reduction in the traffic of notification/callback requests the NF service producer generates towards the consumer, for different scope levels, such as for all notifications targeting the consumer NF instance, for notifications targeting specific services of the consumer NF, for specific notifications of a same consumer service, or for all notifications targeting an NF set or NF service set. In addition, certain embodiments enable an NF service producer or an SCP receiving the signaling about the overload condition to reduce the load by suppressing notifications towards overloaded targets and/or to redirect notifications towards other targets.

As mentioned above, an overload in an NF service consumer may affect the entire NF or may affect just specific services within the NF service consumer, e.g., the service(s) that handle certain notifications. According to an embodiment, in the case where the entire NF is affected, the NF service producers may need to throttle any notification sent towards the NF service consumer (according to the traffic reduction metric). According to an embodiment, in the case where only specific services within the NF service consumer are affected, the NF service producers should throttle just notifications that are handed by the overloaded services.

Alternatively, in a further embodiment, the NF service producer or SCP may send these notifications to an alternative NF consumer instance (if possible). For instance, if the NF service consumer provided a binding indication with NF service set level when subscribing to the notification, and overload was reported for an NF service instance, the NF service producer or the SCP (the latter based on the routing binding indication carried in the notification request) may send the notification to another NF service instance. If the NF service consumer provided a binding indication with NF set level when subscribing to the notification, and overload was reported for an NF instance, the NF service producer or the SCP (the latter based on the routing binding indication carried in the notification request) may send the notification to another NF instance.

In an embodiment, if the SCP decides to redirect the notification as described above, the SCP may remove the overload control information from the messages (e.g., notification responses) in which it received that overload control information before forwarding those messages to the NF service producer.

Further, an overload may also affect not only the NF service consumer, but the entire NF set to which the NF Service Consumer pertains, such as an entire AMF set, or an entire NF service set within the NF service consumer instance, such as an SMF service set. In such cases, the NF service producers may throttle notifications targeting the entire NF Set or NF Service Set.

It is noted that subscription requests (to subscribe to notifications) may or may not contain the NF instance ID of the NF service consumer and the name of the service that handles the notifications in 5GC application programming interfaces (APIs). Subscription requests contain a notification (also called callback) URI that contains the URI to be used to send notifications. The callback URI may contain a http scheme, host part and path (e.g., https://amf1.example.com/xyz/1234).

3GPP Release-16 also introduces a new binding concept (see TS 23.501, 23.502 and TS 29.500) that allows an NF service consumer to provide a binding indication to the NF service producer when subscribing to notifications. This binding indication enables the routing of the notifications towards an alternative consumer notification end point if, for example, the notification URI that was provided in the subscription request is not reachable.

Therefore, as introduced above, certain embodiments are configured to enable the support of scope information for an OCI that is (a) set to a notification (callback) uniform resource identifier (URI), and/or (b) set to NF Service Instance, NF Service Set, NF Instance or NF Set, plus optionally service name. This allows for the throttling or redirecting of notification or callback requests sent by NF producers towards an overloaded consumer.

In the following, some examples will be provided to illustrate the operation of some embodiments. In the following examples, it is assumed that the scope is set to a notification (callback) URI and that the NF Service Consumer (e.g., policy control function (PCF)) has created three subscriptions in the NF Service Producer (e.g., AMF), to receive notifications corresponding to different events, with the following notification URIs respectively:

subscription 1, notification URI=https://pcf12.example.com/serviceX/1234;

subscription 2, notification URI=https://pcf12.example.com/serviceY/abc; and subscription 3, notification URI=https://pcf12.example.com/serviceY/def.

As a first example, a NF service consumer (e.g., PCF), in overload, sends a notification response to NF service producer (e.g., AMF), including an OCI header with a scope including the notification URI set to "https://pcf12/example/com". In this case, the OCI (and thus traffic throttling) applies to notifications generated for all the three subscriptions. This corresponds, for instance, to a scenario where the entire NF service consumer (e.g., PCF12) is overloaded.

As a second example, a NF service consumer (e.g., PCF), in overload, sends a notification response to NF service producer (e.g., AMF), including an OCI header with a scope including the notification URI set to "https://pcf12/example/com/serviceY". In this case, the OCI (and thus traffic throttling) applies to notifications generated for the subscriptions 2 and 3. This corresponds, for instance, to a scenario where a specific NF service consumer service (service Y) is overloaded. The OCI does not affect notifications generated for subscription 1, i.e., sent to service X of PCF 12.

As a third example, a NF service consumer (e.g., PCF), in overload, sends a notification response to NF service producer (e.g., AMF), including an OCI header with a scope including the notification URI set to "https://pcf12/example/com/serviceY/abc". In this case, the OCI (and thus traffic throttling) applies to notifications generated for the subscription 2. This corresponds, for instance, to a scenario where the NF service consumer only needs to throttle specific types of notifications received for a given service (service Y). The OCI does not affect notifications generated for subscriptions 1 and 3.

In some embodiments, how a NF service consumer builds its notification URIs in subscription requests and in the scope of OCI may be implementation specific. This leaves full freedom to the NF service consumer implementation on how it wishes to handle overload dependent on its software architecture.

As discussed above, some embodiments are configured to enable the support of scope information for an OCI that is set to NF Service Instance, NF Service Set, NF Instance or NF Set, plus optionally service name handling notifications in a NF service consumer. An OCI received with this scope applies to all notification/callback requests received with a matching binding indication (binding indication for notification/callbacks, i.e., with scope set to "callback"). The use of this scope assumes that the subscription request (when subscribing to notifications) includes a binding indication. A binding indication with a scope set to "callback" indicates an NF instance ID, NF Set ID, NF Service Instance ID, and/or NF service set ID, and optionally a service name to use for routing the notification/callback requests towards the consumer, e.g., when the notification URI received in the subscription is not reachable.

According to certain embodiments, the scope of the OCI matches the binding indication associated to the subscription if: the OCI indicates an NF set ID and the subscription is bound to the same NF set ID, the OCI indicates an NF instance ID and the subscription is bound to the same NF instance ID, the OCI indicates an NF service set ID and the subscription is bound to the same NF service set, the OCI indicates an NF service instance and the subscription is bound to the same service instance, and/or the OCI indicates any of the above ID(s) plus a service name and the subscription is bound to the same ID and the same service name.

In the following, some additional examples will be discussed to illustrate some additional example embodiments. In the following examples, it is assumed that the NF service consumer (e.g., PCF) has created three subscriptions in the NF Service Producer (e.g., AMF), to receive notifications corresponding to different events, with the following notification URIs and binding indication:

- subscription 1, notification URI=https://pcf12.example.com/serviceX/1234, binding to PCF service set X within PCF12 Instance ID within PCF set Z;
- subscription 2, notification URI=https://pcf12.example.com/serviceY/abc, binding to PCF service set Y within PCF12 Instance ID within PCF Set Z;
- subscription 3, notification URI=https://pcf12.example.com/def, binding to PCF service name "def" within PCF12 instance ID within PCF Set Z.

As a fourth example, a NF service consumer (e.g., PCF) in overload sends a notification response (or service request) to a NF service producer (e.g., AMF), including an OCI header with a scope including the PCF12 (NF) Instance ID. In this case, the OCI (and thus traffic throttling) applies to notifications generated for all the three subscriptions towards PCF12. This corresponds, for instance, to a scenario where the entire NF service consumer (PCF12) is overloaded.

As a fifth example, a NF service consumer (e.g., PCF), in overload, sends a notification response to a NF service producer (e.g., AMF), including an OCI header with a scope including the Service Set Y of PCF12. In this case, the OCI (and thus traffic throttling) applies to notifications generated for the subscription 2 towards PCF12. This corresponds, for instance, to a scenario where a specific NF service set of the NF consumer is overloaded. The OCI does not affect notifications generated for subscriptions 1 and 3, i.e., sent to service set X or to service "def" of PCF 12.

As a sixth example, a NF Service Consumer (e.g., PCF), in overload, sends a notification response to a NF service producer (e.g., AMF), including an OCI header with a scope including the PCF12 (NF) Instance ID and the service name "def". In this case, the OCI (and thus traffic throttling) applies to notifications generated for the subscription 3. This corresponds for instance to a scenario where the NF service consumer only needs to throttle specific notifications received for a given service (service "def"). The OCI does not affect notifications generated for subscriptions 1 and 2.

It may be that, for one service, there are several notifications and overload only applies for one of them. To enable support for such a scenario with the scopes proposed above, the scope parameter may additionally contain the path part of the URI, or some other notification correlation ID. For example, if the scope of OCI indicates the PCF12 (NF) Instance ID and a "path" parameter set to "/serviceY/abc", this would result in throttling notifications of subscription 2 only.

It should be noted that the examples discussed above are provided for purposes of illustrating some example embodiments; however, example embodiments are not limited in any way to these examples and can be applied in myriad of ways.

Figure 3A:
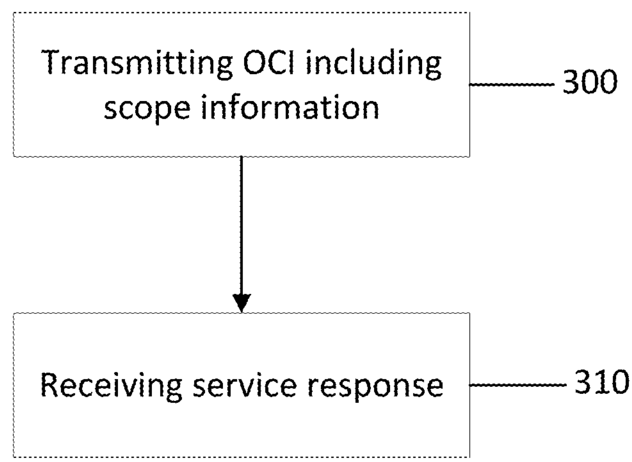
FIG. 3*a* illustrates an example flow diagram of a method, according to an embodiment.

FIG. 3*a* illustrates an example flow diagram of a method for load and/or overload control in 5GC, according to one example embodiment. In an example embodiment, the flow diagram of FIG. 3*a* may be performed by a network entity or network node associated with a communication system, such as LTE or 5G NR. For instance, in some example embodiments, the network node performing the method of FIG. 3*a* may include a base station, eNB, gNB, NG-RAN node, and/or service consumer or PCF. In one example embodiment, the method of FIG. 3*a* may be performed by a NF service consumer, such as those illustrated in FIG. 1 or 2.

As illustrated in the example of FIG. 3*a*, the method may include, at 300, transmitting an OCI including scope information to a NF service producer or SCP. In some embodiments, the scope information may include at least one of: (a) scope set to a notification (callback) uniform resource identifier (URI), and/or (b) scope set to NF Service Instance, NF Service Set, NF Instance or NF Set, plus optionally service name.

According to an embodiment, when OCI is transmitted with the scope set to the notification (callback) URI, the OCI applies to all notification or callback requests with a notification (callback) URI matching the notification URI received in the scope. In one embodiment, the notification URI of a notification (or callback) request matches the notification URI received in the scope of the OCI when the former contains the same scheme, the same authority, and/or has a path that encompasses the path of the latter.

In an embodiment, when OCI is transmitted with the scope is set to one of NF Service Instance, NF Service Set, NF Instance or NF Set, plus optionally service name, the OCI applies to notification or callback requests with a matching binding indication. This binding indication enables the routing of the notifications towards an alternative consumer notification end point. In some embodiments, the method of FIG. 3*a* may also optionally include, at 310, receiving a service response from the NF service producer or SCP.

Figure 3B:
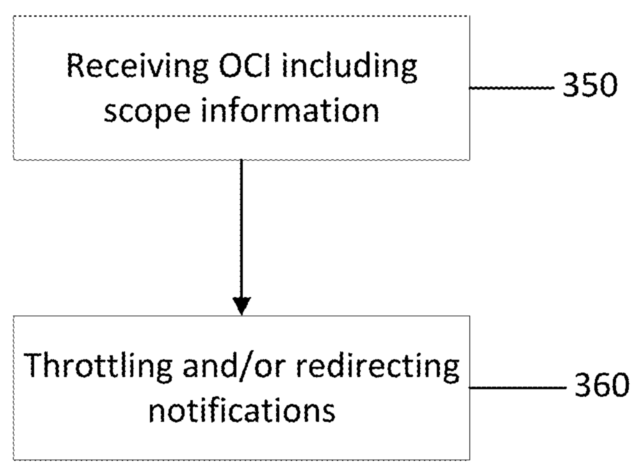
FIG. 3*b* illustrates an example flow diagram of a method, according to an embodiment.

FIG. 3*b* illustrates an example flow diagram of a method for load and/or overload control in 5GC, according to one example embodiment. In an example embodiment, the flow diagram of FIG. 3*b* may be performed by a network entity or network node associated with a communication system, such as LTE or 5G NR. For instance, in some example embodiments, the network node performing the method of FIG. 3*b* may include a base station, eNB, gNB, NG-RAN node, and/or service producer, SCP, and/or AMF. In one example embodiment, the method of FIG. 3*b* may be performed by a NF service producer, such as those illustrated in FIG. 1 or 2.

As illustrated in the example of FIG. 3*b*, the method may include, at 350, receiving an OCI including scope information from a NF service consumer. In some embodiments, the scope information may include at least one of: (a) scope set to a notification (callback) uniform resource identifier (URI), and/or (b) scope set to NF Service Instance, NF Service Set, NF Instance or NF Set, plus optionally service name.

In an embodiment, the method may also include, at 360, based on the received OCI, throttling notifications toward overloaded targets and/or redirecting notifications towards other targets.

According to an embodiment, when OCI is received with the scope is set to the notification (callback URI, the OCI applies to all notification or callback requests with a notification (callback) URI matching the notification URI received in the scope. In one embodiment, the notification URI of a notification (or callback) request matches the notification URI received in the scope of the OCI when the former contains the same scheme, the same authority, and/or has a path that encompasses the path of the latter.

In an embodiment, when OCI is received with the scope is set to one of NF Service Instance, NF Service Set, NF Instance or NF Set, plus optionally service name, the OCI applies to notification or callback requests received with a matching binding indication. This binding indication enables the routing of the notifications towards an alternative consumer notification end point.

Thus, in some embodiments, the throttling 360 may include throttling any notifications sent towards the NF service consumer. According to certain embodiments, the throttling 360 may include throttling notifications that are handled by overloaded services. In an embodiment, the throttling 360 may include throttling the notifications targeting an entire NF set or NF service set.

According to certain embodiments, the redirecting 360 may include sending the notifications to an alternative NF consumer instance. For instance, if a binding indication with NF service set level was provided by the NF service consumer when subscribing to the notification, and overload was reported for an NF service instance at 350, the redirecting 360 may include sending the notification to another NF service instance. If a binding indication with NF set level was provided by the NF service consumer when subscribing to the notification, and overload was reported for an NF instance at 350, the redirecting 360 may include sending the notification to another NF instance. In an embodiment, the method may include removing OCI from the notification before sending the notification to the alternative NF consumer instance.

Figure 4A:
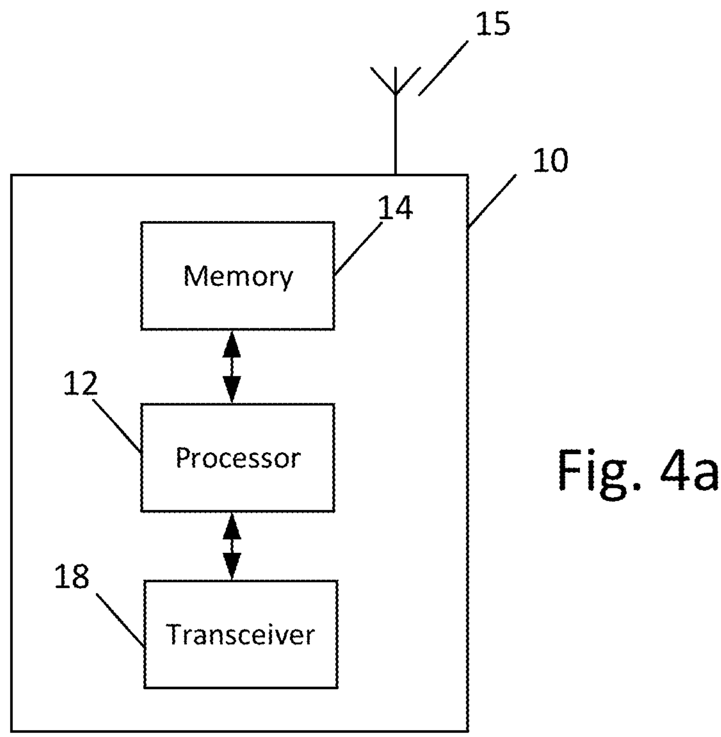
FIG. 4*a* illustrates an example block diagram of an apparatus, according to an embodiment.

FIG. 4*a* illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), IAB node, and/or WLAN access point, associated with a radio access network, such as a LTE network, 5G or NR. In example embodiments, apparatus 10 may be or may include a NG-RAN node, an eNB in LTE, gNB in 5G, a NF service consumer, PCF, or the like. For instance, in one embodiment, apparatus 10 may correspond to the NF service consumer illustrated in the examples of FIG. 1 or 2.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4*a*.

As illustrated in the example of FIG. 4*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4*a*, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (for example, digital-to-analog converters and the like), mappers, a Fast Fourier Transform (FFT) module, and/or the like, e.g., to generate symbols for transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, IAB node, WLAN access point, NF service consumer, PCF, or the like. For example, in some embodiments, apparatus 10 may be configured to perform one or more of the processes depicted in any of the flow charts or signaling diagrams described herein, such as those illustrated in FIG. 1, 2, 3*a* or 3*b*. In some embodiments, as discussed herein, apparatus 10 may be configured to perform a procedure relating to load or overload control in 5G.

According to this embodiment, apparatus 10 may be controlled by memory 14 and processor 12 to transmit an OCI including scope information to a NF service producer or SCP. In some embodiments, the scope information may include at least one of: (a) scope set to a notification (callback) uniform resource identifier (URI), and/or (b) scope set to NF Service Instance, NF Service Set, NF Instance or NF Set, plus optionally service name.

According to an embodiment, when apparatus 10 is controlled to transmit OCI with the scope is set to the notification (callback) URI, the OCI applies to all notification or callback requests with a notification (callback) URI matching the notification URI received in the scope. In one embodiment, the notification URI of a notification (or callback) request matches the notification URI received in the scope of the OCI when the former contains the same scheme, the same authority, and/or has a path that encompasses the path of the latter.

In an embodiment, when apparatus 10 is controlled to transmit OCI with the scope is set to one of NF Service Instance, NF Service Set, NF Instance or NF Set, plus optionally service name, the OCI applies to notification or callback requests received with a matching binding indication. This binding indication enables the routing of the notifications towards an alternative consumer notification end point. In some embodiments, apparatus 10 may be controlled by memory 14 and processor 12 to receive a service response from the NF service producer or SCP.

Figure 4B:
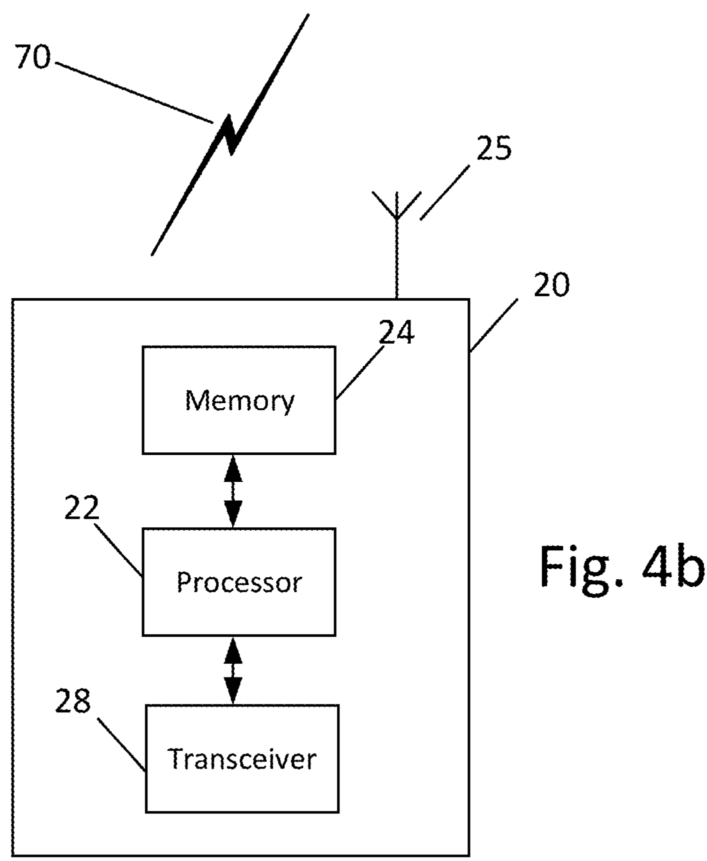
FIG. 4*b* illustrates an example block diagram of an apparatus, according to an embodiment.

FIG. 4*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. In some embodiments, apparatus 20 may be a satellite, base station, a Node B, an evolved Node B (eNB), 5G Node B or access point, next generation Node B (NG-NB or gNB), IAB node, WLAN access point, and/or NF service producer, SCP, AMF, associated with a radio access network, such as a LTE network, 5G or NR. In example embodiments, apparatus 10 may be or may include a NG-RAN node, an eNB in LTE, gNB in 5G, or the like. For instance, in one embodiment, apparatus 20 may correspond to the NF service producer illustrated in FIG. 1 or 2.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4*b*.

As illustrated in the example of FIG. 4*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4*b*, multiple processors may be utilized according to other example embodiments. For example, it should be understood that, in certain embodiments, apparatus 20 may include two or more processors that may form a multiprocessor system (e.g., in this case processor 22 may represent a multiprocessor) that may support multiprocessing. In some embodiments, the multiprocessor system may be tightly coupled or loosely coupled (e.g., to form a computer cluster).

Processor 22 may perform functions associated with the operation of apparatus 20 including, as some non-limiting examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and/or for transmitting via an uplink from apparatus 20. According to certain embodiments, apparatus 20 may further include a transceiver 28 configured to transmit and receive information. In one example, the transceiver 28 may also include a radio interface (e.g., a modem) coupled to the antenna 25. In some embodiments, the radio interface may correspond to a plurality of radio access technologies including one or more of GSM, LTE, LTE-A, 5G, NR, WLAN, NB-IoT, Bluetooth, BT-LE, NFC, RFID, UWB, and the like. In further example embodiments, the radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and/or memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a NF service producer, SCP, AMF, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1, 2, 3*a* or 3*b*. In certain embodiments, apparatus 20 may include or represent a NF service producer and may be configured to perform a procedure relating to load or overload control in 5G, for instance.

In certain embodiments, apparatus 20 may be controlled by memory 24 and processor 22 to receive an OCI including scope information from a NF service consumer or PCF. In some embodiments, the scope information may include at least one of: (a) scope set to a notification (callback) uniform resource identifier (URI), and/or (b) scope set to NF Service Instance, NF Service Set, NF Instance or NF Set, plus optionally service name.

In an embodiment, apparatus 20 may be controlled by memory 24 and processor 22 to, based on the received OCI, throttle notifications toward overloaded targets and/or redirect notifications towards other targets.

According to an embodiment, when OCI is received with the scope is set to the notification (callback URI, the OCI applies to all notification or callback requests with a notification (callback) URI matching the notification URI received in the scope. In one embodiment, the notification URI of a notification (or callback) request matches the notification URI received in the scope of the OCI when the former contains the same scheme, the same authority, and/or has a path that encompasses the path of the latter.

In an embodiment, when OCI is received with the scope is set to one of NF Service Instance, NF Service Set, NF Instance or NF Set, plus optionally service name, the OCI applies to notification or callback requests received with a matching binding indication. This binding indication enables the routing of the notifications towards an alternative consumer notification end point.

In some embodiments, apparatus 20 may be controlled by memory 24 and processor 22 to throttle any notifications sent towards the NF service consumer. According to certain embodiments, apparatus 20 may be controlled by memory 24 and processor 22 to throttle notifications that are handled by overloaded services. In an embodiment, apparatus 20 may be controlled by memory 24 and processor 22 to throttle the notifications targeting an entire NF set or NF service set.

According to certain embodiments, apparatus 20 may be controlled by memory 24 and processor 22 to redirect the notifications by sending the notifications to an alternative NF consumer instance. For instance, if a binding indication with NF service set level was provided by the NF service consumer when subscribing to the notification, and overload was reported for an NF service instance, apparatus 20 may be controlled by memory 24 and processor 22 to redirect the notifications by sending the notification to another NF service instance. If a binding indication with NF set level was provided by the NF service consumer when subscribing to the notification, and overload was reported for an NF instance, apparatus 20 may be controlled by memory 24 and processor 22 to redirect the notifications by sending the notification to another NF instance. In an embodiment, apparatus 20 may be controlled by memory 24 and processor 22 to remove OCI from the notification before sending the notification to the alternative NF consumer instance.

Therefore, certain example embodiments provide several technological improvements, enhancements, and/or advantages over existing technological processes and constitute an improvement at least to the technological field of wireless network control and management. For example, certain embodiments enable an NF service consumer to signal an overload condition to NF service producers, allowing to reduce the traffic of notification/callback requests the NF service producer generates towards the consumer, for different scope levels. For example, the scope levels may include, for all notifications targeting the consumer NF instance, for notifications targeting specific services of the consumer NF, for specific notifications of a same consumer service, or for all notifications targeting an NF set or NF service set. Furthermore, certain embodiments enable an NF service producer or an SCP receiving the signaling about the overload condition to reduce the load by suppressing notifications towards overloaded targets and/or to redirect notifications towards other targets. Accordingly, the use of certain example embodiments results in improved functioning of communications networks and their nodes, such as, but not limited to, base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

A first embodiment may be directed to a method that includes transmitting, from a network function (NF) service consumer, overload control information (OCI) comprising scope information to a network function (NF) service producer or service communication proxy (SCP). The scope information may comprise at least one of: scope set to a notification or callback uniform resource identifier (URI), or scope set to one of network function (NF) service instance, network function (NF) service set, network function (NF) instance, or network function (NF) set, and optionally a service name.

In a variant, the method may include, when the scope is set to the notification or callback uniform resource identifier (URI), the overload control information (OCI) is configured to apply to all notification or callback requests with a notification or callback uniform resource identifier (URI) matching the notification or callback uniform resource identifier (URI) set in the scope.

In a variant, the method may further include transmitting a binding indication from the network function (NF) service consumer to the network function (NF) service producer matching one or several notification or callback requests, and, when the scope is set to one of network function (NF) service instance, network function (NF) service set, network function (NF) instance, or network function (NF) set, optionally together with a service name, the overload control information (OCI) is configured to apply to notification or callback requests with a matching binding indication.

A second embodiment may be directed to a method that includes receiving, at a network function (NF) service producer or service communication proxy (SCP), overload control information (OCI) comprising scope information from a network function (NF) service consumer. Based on the received overload control information (OCI), the method may include throttling notifications toward overloaded targets and/or redirecting notifications towards other targets to reduce traffic of callback requests. The scope information may comprise at least one of: scope set to a notification or callback uniform resource identifier (URI), or scope set to one of network function (NF) service instance, network function (NF) service set, network function (NF) instance, or network function (NF) set, and optionally a service name.

In a variant, when the scope is set to the notification uniform resource identifier (URI), the overload control information (OCI) is configured to apply to all notification or callback requests with a notification or callback uniform resource identifier (URI) matching the notification or callback uniform resource identifier (URI) set in the scope.

In a variant, the method may also include receiving a binding indication from the network function (NF) service consumer at the network function (NF) service producer matching one or more notification or callback requests, and, when the scope is set to one of network function (NF) service instance, network function (NF) service set, network function (NF) instance, or network function (NF) set, optionally together with a service name, the overload control information (OCI) is configured to apply to notification or callback requests with a matching binding indication.

In a variant, the method may also include receiving a routing binding indication from the network function (NF) service producer at the service communication proxy (SCP) within one or more notification or callback requests, and, when the scope is set to one of network function (NF) service instance, network function (NF) service set, network function (NF) instance, or network function (NF) set, optionally together with a service name, the overload control information (OCI) is configured to apply to notification or callback requests with a matching binding indication.

In a variant, the throttling may comprise throttling any notifications sent towards the network function (NF) service consumer.

In a variant, the throttling may comprise throttling notifications that are handled by overloaded services.

In a variant, the throttling may comprise throttling the notifications targeting an entire network function (NF) set or network function (NF) service set.

In a variant, the redirecting may comprise sending the notifications to an alternative network function (NF) consumer instance.

In a variant, the method may also include removing the overload control information (OCI) from the notification responses before sending the notification responses to the NF service producer.

In a variant, the notification or callback uniform resource identifier (URI) may comprise at least one of: an authority comprising a host and optional port, and/or an optional path.

In a variant, the notification or callback uniform resource identifier (URI) of a notification or callback request matches the notification or callback uniform resource identifier (URI) received in the scope of the overload control information (OCI) when the notification or callback uniform resource identifier (URI) of the notification or callback request contains the same scheme, the same authority and has a path that encompasses the path of the notification or callback uniform resource identifier (URI) received in the scope of the overload control information (OCI).

In a variant, the scope of the overload control information (OCI) matches the binding indication associated to the subscription when at least one of: the overload control information (OCI) indicates an NF Set ID and the subscription is bound to the same NF Set ID; the overload control information (OCI) indicates an NF Instance ID and the subscription is bound to the same NF Instance ID; the overload control information (OCI) indicates an NF Service Set ID and the subscription is bound to the same NF Service Set; the overload control information (OCI) indicates an NF service instance and the subscription is bound to the same service instance; or the overload control information (OCI) indicates any one of the NF Set ID, NF Instance ID, or NF Service Set ID, plus a service name, and the subscription is bound to the same ID and the same service name.

In a variant, the scope set to one of network function (NF) service instance, network function (NF) service set, network function (NF) instance, or network function (NF) set, and optionally a service name, comprises: a scope parameter containing a path part of the uniform resource identifier (URI) or some other notification correlation ID.

A third embodiment is directed to an apparatus including at least one processor and at least one memory comprising computer program code. The at least one memory and computer program code may be configured, with the at least one processor, to cause the apparatus at least to perform the method according to the first embodiment, the second embodiment, and/or any other embodiments discussed herein, or any of the variants described above.

A fourth embodiment is directed to an apparatus that may include circuitry configured to perform the method according to the first embodiment, the second embodiment, and/or any other embodiments discussed herein, or any of the variants described above.

A fifth embodiment is directed to an apparatus that may include means for performing the method according to the first embodiment, the second embodiment, and/or any other embodiments discussed herein, or any of the variants described above.

A sixth embodiment is directed to a non-transitory computer readable medium comprising program instructions stored thereon for performing at least the method according to the first embodiment, the second embodiment, and/or any other embodiments discussed herein, or any of the variants described above.

We claim:

1. An apparatus for implementing a network function (NF) service consumer, comprising:

at least one processor; and at least one memory comprising computer program code, the at least one memory and computer program code are configured, with the at least one processor, to cause the apparatus at least to perform at least:

after an overload condition for the network function service consumer is determined, transmitting, to a network function (NF) service producer, a 3GPP-service based interface (SBI) overload control information (OCI) header, the 3GPP-SBI OCI header comprising overload control information to be used by a network function (NF) service producer for throttling notifications, wherein the overload control information comprises a scope that is set to one of: at least one callback uniform resource identifier (URI); a network function (NF) service instance; network function (NF) service set; network function (NF) instance; network function (NF) set, or a service name; of a service;

wherein, when the scope is set to the at least one callback uniform resource identifier (URI), the overload control information (OCI) is configured to apply to all notification requests or callback requests with a callback uniform resource identifier (URI) matching the at least one callback uniform resource identifier (URI) that is set in the scope, and wherein, when the scope is set to one of the network function (NF) service instance, the network function (NF) service set, the network function (NF) instance, the network function (NF) set, or a service name of the service, the overload control information (OCI) is configured to apply to notification requests or callback requests with a matching binding indication.

2. The apparatus according to claim 1, wherein the at least one memory and computer program code configured, with the at least one processor, to cause the apparatus at least to perform:

transmitting the binding indication to the network function (NF) service producer matching one or several notification request or callback requests.

3. A method, comprising:

determining that a network function (NF) service consumer is in an overload condition; and transmitting, by the network function (NF) service consumer to a network function (NF) service producer, a 3GPP-service based interface (SBI) overload control information (OCI) header, the 3GPP-SBI OCI header comprising overload control information to be used by a network function (NF) service producer for throttling notifications, wherein the overload control information comprises a scope that is set to one of: at least one callback uniform resource identifier (URI); network function (NF) service instance; network function (NF) service set; network function (NF) instance; network function (NF) set, or a service name of a service, wherein, when the scope is set to the at least one callback uniform resource identifier (URI), the overload control information (OCI) is configured to apply to notification requests or callback requests with a callback uniform resource identifier (URI) matching the at least one callback uniform resource identifier (URI), and wherein, when the scope is set to one of the network function (NF) service instance, the network function (NF) service set, the network function (NF) instance, the network function (NF) set, or the service name of the service, the overload control information (OCI) is configured to apply to notification requests or callback requests with a matching binding indication.

4. The method according to claim 3, further comprising transmitting a binding indication from the network function (NF) service consumer to the network function (NF) service producer matching one or several notification or callback requests.

5. An apparatus for implementing a network function (NF) service producer, comprising:

at least one processor; and at least one memory comprising computer program code, the at least one memory and computer program code are configured, with the at least one processor, to cause the apparatus at least to perform:

receiving, from a network function (NF) service consumer, a 3GPP-service based interface (SBI) overload control information (OCI) header comprising overload control information, wherein the overload control information comprises a scope that is set to one of: at least one callback uniform resource identifier (URI), a network function (NF) service instance, a network function (NF) service set, a network function (NF) instance, network function (NF) set, or a service name of a service; and based on the scope of the overload control information, throttling notifications toward overloaded targets and/or redirecting notifications towards other targets, wherein, when the scope is set to the at least one callback uniform resource identifier (URI), the overload control information (OCI) is configured to apply to all notification requests or callback requests with a callback uniform resource identifier (URI) matching the at least one callback uniform resource identifier (URI) that is set in the scope; and wherein, when the scope is set to one of the network function (NF) service instance, the network function (NF) service set, the network function (NF) instance, the network function (NF) set, or a service name of a service, the overload control information (OCI) is configured to apply to notification requests or callback requests with a matching binding indication.

6. The apparatus according to claim 5, wherein the at least one memory and computer program code configured, with the at least one processor, to cause the apparatus at least to perform:

receiving the matching binding indication, from the network function (NF) service consumer, for matching with one or more notification requests or callback requests.

7. The apparatus according to claim 5, wherein the at least one memory and computer program code configured, with the at least one processor, to cause the apparatus at least to perform:

receiving a routing binding indication, from a network function (NF) service consumer, within one or more notification requests or callback requests.

8. The apparatus according to claim 5, wherein, the throttling, wherein the overloaded targets comprise the NF service consumer, and wherein the throttling notifications to other targets comprises:

throttling any notifications sent towards the NF service consumer.

9. The apparatus according to claim 5, wherein the overloaded targets comprise the NF service consumer, and wherein the throttling notifications towards other targets comprises:

throttling notifications that are handled by overloaded services of the NF service consumer.

10. The apparatus according to claim 5, wherein the overloaded targets comprise an entire network function (NF) set or network function (NF) service set and wherein the throttling notifications to other targets comprises:

throttling notifications targeting the entire NF set or NF service set.

11. The apparatus according to claim 5, wherein the other targets comprise an alternative network function (NF) consumer instance, and wherein the redirecting notifications targeting other targets comprises:

sending the notifications to the alternative network function (NF) consumer instance.

12. The apparatus according to claim 5, wherein the at least one callback uniform resource identifier (URI) of a notification request or callback request matches the notification or callback uniform resource identifier (URI) received in the scope of the overload control information (OCI) when the at least one callback uniform resource identifier (URI) of the notification or callback request contains the same scheme, the same authority and has a path that encompasses the path of the notification or callback uniform resource identifier (URI) received in the scope of the overload control information (OCI).

13. The apparatus according to claim 6, wherein the scope of the overload control information (OCI) matches the binding indication associated to the subscription when at least one of:

the overload control information (OCI) indicates an identifier of network function (NF) set and the subscription is bound to the identifier of the network function (NF) set;

the overload control information (OCI) indicates an identifier of network function (NF) instance and the subscription is bound to the identifier of the network function (NF) instance;

the overload control information (OCI) indicates an identifier of the network function (NF) service set and the subscription is bound to the identifier of the network function (NF) service set;

the overload control information (OCI) indicates an identifier of the network function (NF) service instance and the subscription is bound to the identifier of the service instance; or the overload control information (OCI) indicates any one of the identifier of the network function (NF) set, identifier of the network function (NF) instance, identifier of the or network function (NF) service set, a service name, and the subscription is bound to the identifier of the NF set, the NF instance, or the NF service set and the service name indicated in the OCI.

14. A method, comprising:

receiving, at a network function (NF) service producer from a network function (NF) service consumer, a 3GPP-service based interface (SBI) overload control information (OCI) header comprising overload control information, wherein the overload control information comprises a scope that is set to one of: at least one callback uniform resource identifier (URI), a network function (NF) service instance, a network function (NF) service set, a network function (NF) instance, a network function (NF) set, or a service name of a service; and based on the scope of the overload control information, throttling notifications toward overloaded targets and/or redirecting notifications towards other targets, wherein, when the scope is set to the at least one callback uniform resource identifier (URI), the overload control information (OCI) is configured to apply to all notification requests or callback requests with a callback uniform resource identifier (URI) matching the at least one callback uniform resource identifier (URI) that is set in the scope, and wherein, when the scope is set to one of the network function (NF) service instance, the network function (NF) service set, the network function (NF) instance, the network function (NF) set, or the service name of the service, the overload control information (OCI) is configured to apply to notification requests or callback requests with a matching binding indication.

15. The method according to claim 14, further comprising receiving the matching binding indication from the network function (NF) service consumer at the network function (NF) service producer for matching with one or more notification requests or callback requests.

16. The method according to claim 14, further comprising receiving a routing binding indication from the network function (NF) service consumer within one or more notification requests or callback requests.

17. The method according to claim 14, wherein the overloaded targets comprise the NF service consumer, and wherein throttling notifications toward overloaded targets comprises throttling any notifications sent towards the network function (NF) service consumer.

18. The method according to claim 14, wherein the overloaded targets comprise the NF service consumer and wherein throttling notifications toward overloaded targets comprises throttling notifications that are handled by overloaded services of the network function (NF) service consumer.

19. The method according to claim 14, wherein the overloaded targets comprise an entire network function (NF) set or network function (NF) service set and wherein throttling notifications toward overloaded targets comprises throttling notifications targeting the entire network function (NF) set or the network function (NF) service set.

20. The method according to claim 14, wherein the other targets comprise an alternative network function (NF) consumer instance and wherein redirecting comprises sending the notifications to the alternative network function (NF) consumer instance.

* * * * *